US009411394B2

United States Patent
Younger et al.

(10) Patent No.: US 9,411,394 B2
(45) Date of Patent: *Aug. 9, 2016

(54) PHY BASED WAKE UP FROM LOW POWER MODE OPERATION

(71) Applicant: Seagate Technology LLC, Cupertino, CA (US)

(72) Inventors: Scott Thomas Younger, Shakopee, MN (US); Thomas John Skaar, Eagan, MN (US); Anthony L. Priborsky, Lyons, CO (US); Eric James Behnke, Boulder, CO (US)

(73) Assignee: Seagate Technology LLC, Cupertino, CA (US)

( * ) Notice: Subject to any disclaimer, the term of this patent is extended or adjusted under 35 U.S.C. 154(b) by 442 days.

This patent is subject to a terminal disclaimer.

(21) Appl. No.: 13/844,580

(22) Filed: Mar. 15, 2013

(65) Prior Publication Data
US 2014/0281626 A1    Sep. 18, 2014

(51) Int. Cl.
*G06F 1/00* (2006.01)
*G06F 1/32* (2006.01)

(52) U.S. Cl.
CPC ............ *G06F 1/3206* (2013.01); *G06F 1/3203* (2013.01); *G06F 1/3209* (2013.01); *G06F 1/3268* (2013.01); *G06F 1/3287* (2013.01); *G06F 1/3215* (2013.01); *Y02B 60/1246* (2013.01); *Y02B 60/1282* (2013.01); *Y02B 60/32* (2013.01)

(58) Field of Classification Search
CPC ... G06F 1/3203; G06F 1/3215; G06F 1/3268; G06F 1/3287
See application file for complete search history.

(56) References Cited

U.S. PATENT DOCUMENTS

| 5,544,138 A | 8/1996 | Bajorek et al. |
| 5,920,726 A | 7/1999 | Anderson |
| 6,401,193 B1 | 6/2002 | Afsar et al. |
| 6,665,802 B1 * | 12/2003 | Ober ................ G06F 1/26 713/320 |
| 6,720,673 B2 | 4/2004 | Blanco et al. |
| 6,795,876 B1 | 9/2004 | Solomon |
| 7,017,078 B2 | 3/2006 | Frimout |

(Continued)

OTHER PUBLICATIONS

Lee, et al., "A fast, high-endurance and scalable non-volatile memory device made from asymmetric Ta2O5_x/TaO2_x bilayer structures," Nature Materials, Jul. 10, 2011, pp. 1-6, DOI: 10.1038/NMAT3070; Macmillan Publishers Limited.

*Primary Examiner* — Mohammed Rehman
*Assistant Examiner* — Gayathri Sampath
(74) *Attorney, Agent, or Firm* — Hall Estill Attorneys at Law

(57) ABSTRACT

Apparatus and method for supplying electrical power to a device. A system on chip (SOC) integrated circuit includes a first region having a processing core and a second region characterized as an always on domain (AOD) power island having a power control block with an energy detector coupled to a host input line. First and second power supply modules respectively supply power to the first and second regions. The second power supply module includes a main switch between the first power supply module and a host input voltage terminal. The power control block opens the main switch to enter a low power mode during which no power is supplied to the first region, and the power control block closes the main switch to resume application of power to the first region responsive to the energy detector detecting electrical energy on the host input line.

20 Claims, 5 Drawing Sheets

(56) References Cited

U.S. PATENT DOCUMENTS

| | | |
|---|---|---|
| 7,181,565 B2 | 2/2007 | Surico et al. |
| 7,191,327 B2 | 3/2007 | Viljoen et al. |
| 7,254,732 B2 | 8/2007 | Bashford et al. |
| 7,295,462 B2 | 11/2007 | Farnworth |
| 7,380,059 B2 | 5/2008 | Burton |
| 7,506,335 B1 | 3/2009 | Wooff et al. |
| 7,539,048 B2 | 5/2009 | Farnworth |
| 7,542,091 B2 | 6/2009 | Bean et al. |
| 7,797,525 B2 | 9/2010 | Lee et al. |
| 7,873,059 B2 | 1/2011 | Morita et al. |
| 7,904,604 B2 | 3/2011 | Lum et al. |
| 7,911,840 B2 | 3/2011 | Wu et al. |
| 7,930,485 B2 | 4/2011 | Fertig et al. |
| 7,937,602 B2 | 5/2011 | Elliott et al. |
| 7,941,682 B2 | 5/2011 | Adams |
| 8,027,207 B2 | 9/2011 | Fifield et al. |
| 8,028,155 B1 | 9/2011 | Righi et al. |
| 8,077,520 B1 | 12/2011 | Yang et al. |
| 8,095,851 B2 | 1/2012 | Diggs et al. |
| 8,127,167 B2 | 2/2012 | Wang et al. |
| 8,150,801 B2 | 4/2012 | Srivastava et al. |
| 8,159,869 B2 | 4/2012 | Park et al. |
| 8,199,603 B2 | 6/2012 | Chung et al. |
| 8,258,844 B2 | 9/2012 | Elrod et al. |
| 8,291,251 B2 | 10/2012 | Rauschmayer et al. |
| 2003/0172135 A1 | 9/2003 | Bobick et al. |
| 2008/0098244 A1 | 4/2008 | Clinton et al. |
| 2008/0155331 A1 | 6/2008 | Rothman et al. |
| 2008/0162079 A1 | 7/2008 | Astigarraga et al. |
| 2008/0244296 A1* | 10/2008 | Kangas ............. G06F 1/30 713/330 |
| 2008/0276105 A1* | 11/2008 | Hoberman et al. ........... 713/300 |
| 2009/0201082 A1* | 8/2009 | Smith et al. .................. 327/544 |
| 2010/0023870 A1 | 1/2010 | Baker |
| 2010/0027327 A1 | 2/2010 | Chung et al. |
| 2010/0109633 A1* | 5/2010 | Sofer et al. .................. 323/313 |
| 2011/0075473 A1 | 3/2011 | Park et al. |
| 2011/0188292 A1 | 8/2011 | Joo et al. |
| 2011/0239012 A1* | 9/2011 | Kohinata et al. ............. 713/310 |
| 2012/0072639 A1 | 3/2012 | Goss et al. |
| 2012/0151162 A1 | 6/2012 | Trantham et al. |
| 2012/0221576 A1 | 8/2012 | Marquardt et al. |
| 2012/0260159 A1 | 10/2012 | Lazier et al. |
| 2012/0284230 A1 | 11/2012 | Adkins et al. |

* cited by examiner

PHY BASED WAKE UP FROM LOW POWER MODE OPERATION

SUMMARY

Various embodiments of the present disclosure are generally directed to a method and apparatus for supplying electrical power to a circuit.

In accordance with some embodiments, a system on chip (SOC) integrated circuit includes a first region having a processing core and a second region characterized as an always on domain (AOD) power island having a power control block with an energy detector coupled to a host input line.

First and second power supply modules respectively supply power to the first and second regions. The second power supply module includes a main switch between the first power supply module and a host input voltage terminal.

The power control block opens the main switch to enter a low power mode during which no power is supplied to the first region, and the power control block closes the main switch to resume application of power to the first region responsive to the energy detector detecting electrical energy on the host input line.

These and other features and aspects which characterize various embodiments of the present disclosure can be understood in view of the following detailed discussion and the accompanying drawings.

DETAILED DESCRIPTION

Figure 1:
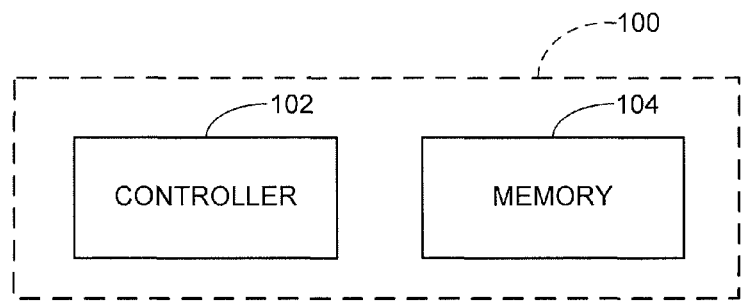
FIG. 1 is a functional representation of a data storage device.

The present disclosure generally relates to power management in an electronic device, and more particularly to a novel "always on" power island configuration to support a low power mode of operation for the device.

It can be highly desirable in electronic devices to achieve significant power consumption reductions by placing the devices in a reduced power mode. So-called low power mode (LPM) generally refers to a power state in which power consumption is held at a very low level, but the device is still able to decode a communicated signal to resume operation. Conceptually, LPM may be thought of as a power state that is just above a completely powered off state.

A challenge with implementing LPM schemes is the fact that many circuits leak when power is applied, particularly in complex circuits such as application specific integrated circuits (ASICs), field programmable gate arrays (FPGAs), etc. These and other types of complex circuits, all of which will generally be referred to herein as systems on a chip ("SOC"), can have millions of transistors and other active and passive elements. It can be difficult to reduce power in such devices while continuing to supply voltage due to the myriad opportunities for leakage paths through the circuitry.

Achieving LPM operation in a data storage device can be particularly difficult. Data storage devices, such as hard disc drives (HDDs) or solid state drives (SSDs), often utilize an SOC integrated circuit that operates as a storage controller. Such controllers require power to be applied to significant portions of the circuitry even during low power modes of operation. This is because there is no capability in the SOC architecture to restore power once the SOC itself is powered off. Some SOC functionality is thus required to enable the system to detect a wakeup command and resume normal operation.

External control circuitry, such as an external microcontroller, can be used to reawaken the main SOC, but this type of solution generally requires additional hardware which tends to adds cost, components, complexity and space. Many current generation LPM designs leave the SOC energized and attempt to optimize power consumption around this paradigm.

Other limitations that can be associated with current generation LPM designs include the requirement for multiple power-management interfaces (e.g. serial interface (SIF) signals, multiple general purpose input/output (GPIO) signals, etc.) to control power for the system, which can result in multiple modes and duplicated functionality. Multiple interfaces increase the firmware (FW) and system management differences that need to be accommodated. Other limitations include the fact that voltage regulators are often not individually programmable and therefore cannot always be individually disabled. Serial interface (SIF) control systems generally need to remain powered at all times, which further tends to increase power consumption levels of a device.

Various embodiments of the present disclosure are generally directed to an apparatus and method for operating a device, such as but not limited to a data storage device, in a low power mode (LPM), and for detecting a host wake up signal to exit LPM and return to normal operation. As explained below, some embodiments utilize an SOC having an always on domain (AOD) power island. A cooperative interface is connected to the SOC and communicates with the AOD. The interface includes an LPM module with a main power switch which, when opened, powers down remaining portions of the SOC and, as required, other aspects of the overall device. The AOD and the LPM module are continuously powered from an external source, such as an input host power terminal.

The AOD includes a power control block configured to monitor for one or more types of wake up signals during an LPM period. The power control block monitors for low frequency host signaling provided on an input signal path such as host phy (physical layer) differential voltage communication pins or a single external pin that accommodates a sideband control signal. The wake up signal may take a variety of configurations such as a sequence of differential voltage pulse bursts interspersed with idle periods along the input signal path, a pulse width modulated signal, a bi-state voltage level indicating power down/wake up, etc. The power control block includes an energy detector that monitors the host input signal path for disturbances (voltage variations) potentially indicative of a wake up signal from the host. In some embodiments, the power control block closes the main switch and restores power to the system responsive to a detection of energy on the host input signal path. In other embodiments, the power control block further includes qualification logic that decodes and confirms a wake up signal has been sent and proceeds to transition the main switch to a closed state to re-energize the SOC in response to such qualification. The qualification logic may use a relatively low power, high error clock as part of the qualification process.

A voltage sense circuit can monitor the supplied host power level during the LPM period. If a voltage fault is sensed, the power control block can signal the SOC that the data in the volatile memory may be compromised, allowing the SOC to operate accordingly (e.g., initiate a cold boot rather than a warm boot, etc.).

These and other features and advantages of various embodiments can be understood beginning with a review of FIG. 1 which provides a simplified functional representation of a data storage device 100. The device 100 includes a controller 102 and a memory 104. The controller 102 can take a variety of forms such as a system on a chip (SOC) with programmable processing capabilities using firmware stored in a suitable memory location.

The memory 104 can take a variety of forms and can be used to store user data from a host device (not separately shown). The functionality of the controller 102 and the memory 104 can be incorporated into a single chip, or distributed among different integrated circuit devices and other components (e.g., solid state memory, rotatable memory, etc).

Figure 2:
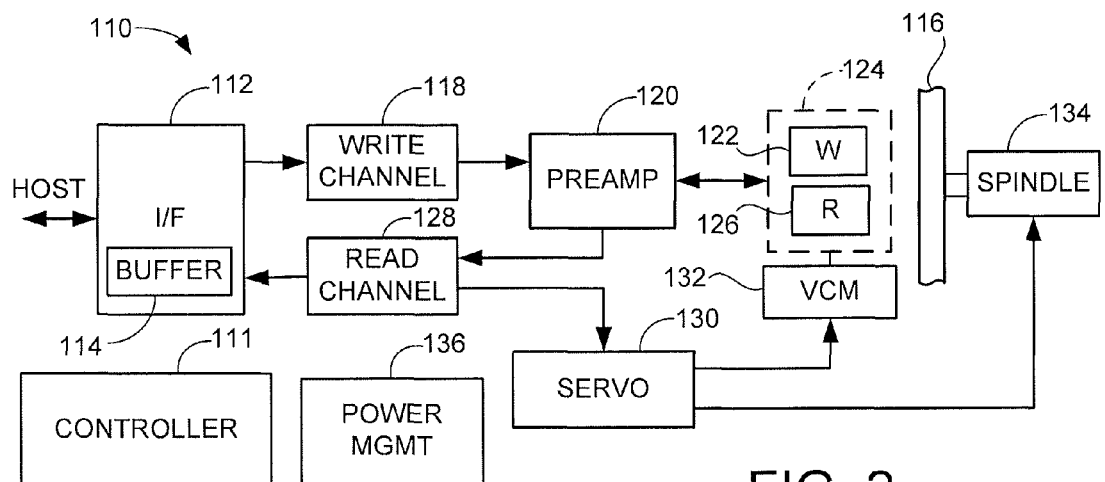
FIG. 2 is a functional representation of another data storage device.

FIG. 2 is a functional block diagram for a data storage device 110 that corresponds to the device 100 of FIG. 1 in some embodiments. The data storage device 110 is characterized for purposes of the present disclosure as a hard disc drive (HDD) that employs magnetic recording to store data to one or more rotatable magnetic recording discs.

The device 110 in FIG. 2 includes a top level controller (SOC) 111. An interface circuit (I/F) 112 communicates with the host device and includes a data buffer 114 to temporarily store data pending transfer between the host device and a rotatable perpendicular data recording medium 116.

A write channel 118 operates to encode input write data from the host to provide a serialized data stream to a preamplifier/driver (preamp) 120. The preamp 120 provides a sequence of write currents to a perpendicular magnetic write element (W) 122 of a data transducer 124 to write data to the medium 116.

During a readback operation, readback signals are transduced by a magneto-resistive (MR) read element (R) 126 of the data transducer 124. The transduced signals are supplied to the preamp 120. The preamp 120 conditions and amplifies the readback signals and provides the same to a read channel 128. The read channel 128 applies signal processing techniques to recover the originally stored data to the buffer 114 pending subsequent transfer to the host.

During both read and write operations, specially configured servo positioning data on the medium 116 are transduced by the read element 126 and, after demodulation by a portion of the read channel 128, are supplied to a servo control circuit 130. The servo control circuit 130 provides positional control signals to a voice coil motor (VCM) 132 coupled to the data transducer 124 to position the respective write and read elements 122, 126 adjacent various data tracks defined on the medium 116.

The servo control circuit 130 further provides control inputs to a spindle motor 134 which rotates the medium 116 during operation. To avoid damage to the device 110, the servo circuit 130 moves the transducer(s) 124 to a safe parking position, such as on a ramp structure or a landing zone, prior to deactivation of the spindle motor 134.

FIG. 2 further depicts a power management circuit 136. The power management circuit 136 operates to supply electrical power to the various constituent elements of the device. While shown as a separate functional block, portions of the power management circuit 136 may be physically incorporated into other blocks of FIG. 2, such as in the controller 111. The construction and operation of the power management circuit 136 in accordance with various embodiments will be discussed in greater detail below.

Figure 3:
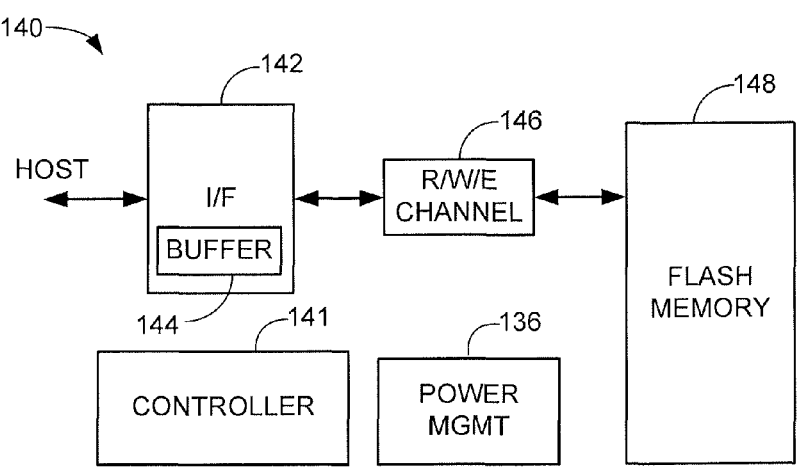
FIG. 3 is a functional representation of another data storage device.

FIG. 3 is a functional block diagram for another data storage device 140 that corresponds to the device 100 of FIG. 1 in some embodiments. The data storage device 140 is characterized as a solid state drive (SSD) that employs non-volatile flash memory to store data from the host device.

As with the HDD device 110 of FIG. 2, the SSD device 140 of FIG. 3 includes a top level controller (SOC) 141 and an I/F circuit 142 with a data buffer 144. A read/write/erase (R/W/E) channel 146 provides read, write and erasure capabilities for one or more flash memory arrays 148. The SSD device 140 includes the aforementioned power management circuit 136 to selectively provide electrical power to the various constituent elements in the device.

It is contemplated that each of the storage devices of FIGS. 1-3 are adapted to operate in a variety of different power modes. These power modes can be arranged in a hierarchy from a lowest mode (deactivated or "off") to a highest mode (normally operating or "fully on"). Various intermediate power mode levels can be defined between these lowest and highest modes. The intermediate power mode levels represent reduced power mode levels of operation in which the device consumes less power than during normal operation.

The savings in power consumption provided by a reduced power mode is offset by an increased response time for the device to transition back and resume normal operation. Generally, the lower the power mode, the longer the device will need to be able to return to an operationally ready state and begin processing access commands from the host.

With regard to the HDD device 110 of FIG. 2, it can be seen that different elements may have different power consumption requirements. Successively lower power modes can be achieved by deactivating (turning off) different elements, or combinations of elements in the device. For example, one or more reduced power modes may be obtained by parking the transducer(s) 124, turning off associated circuits such as the read/write channels 118 and 128, the preamp 120 and the servo circuit 130, turning off the spindle motor 134, etc.

Similarly, the SSD device 140 in FIG. 3 can be transitioned to various reduced power modes by selectively deactivating different elements such as the R/W/E channel 146 and the flash memory 148. These reduced power levels are established by the respective power management circuits 136 and can be referred to by various labels such as a "standby mode," a "sleep mode," etc.

A low power mode (LPM) mode is additionally contemplated for the devices of FIGS. 1-3. As disclosed herein, LPM is just above being fully turned off in terms of power consumption, and is achieved by turning off substantially all of the functionality of the respective controllers 111, 141 and interface circuits 112, 142 as shown in FIGS. 2 and 3. It has been found in some cases that LPM power consumption levels of around 12.5 milliwatts, mW ($1.25 \times 10^{-6}$ W) or less are attainable using the systems disclosed herein.

Figure 4:
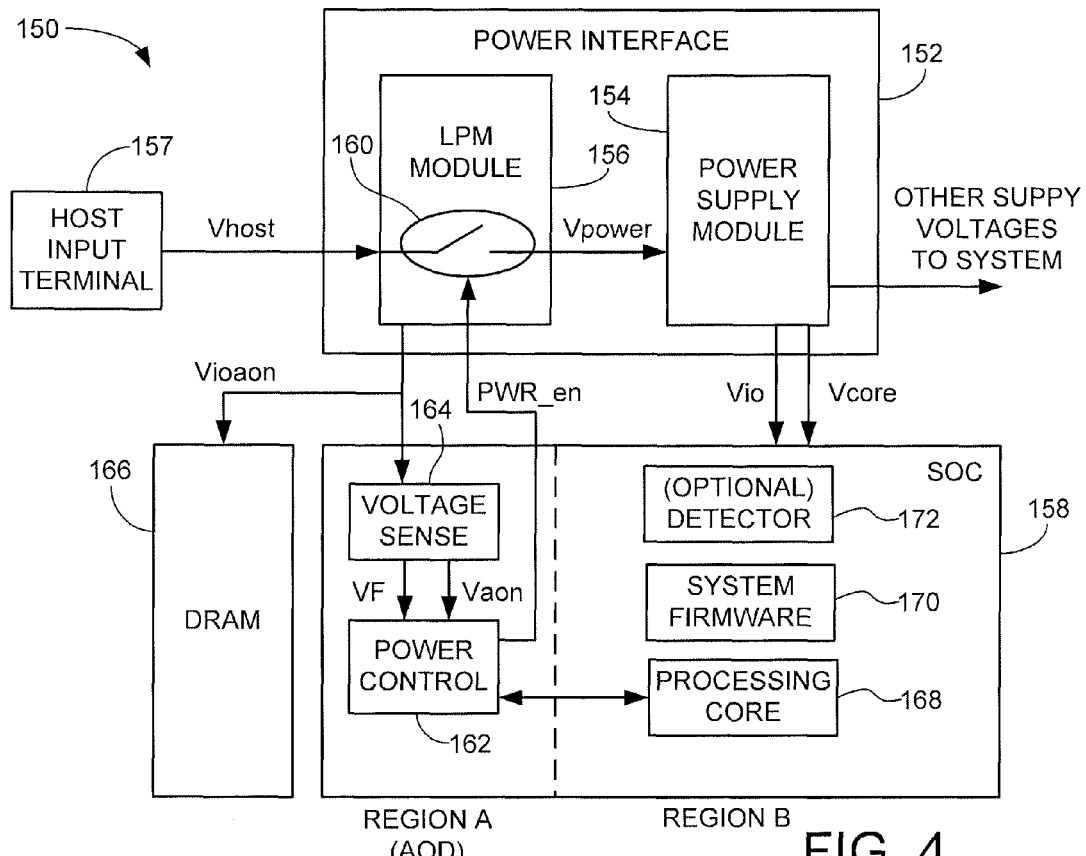
FIG. 4 depicts a power management circuit of the devices of FIGS. 1-3 in accordance with some embodiments of the present disclosure.

FIG. 4 is a functional block representation of relevant portions of a power management circuit 150 generally similar to the power management circuit 136 of FIGS. 2-3. While the circuit 150 can be adapted to supply power to the respective storage devices of FIGS. 1-3, the circuit can be used in other types of operational environments as well. The circuit 150 can be used to enact a variety of power modes for the associated device, including a fully powered mode, an off mode, at least one or more intermediate modes such as a sleep mode and a standby mode, and an low power mode.

The power management circuit 150 includes a power interface 152. The power interface 152 includes a main power supply module 154 and a low power mode (LPM) module 156. For reference, the main power supply module 154 will sometimes be referred to as a "first" power supply module, and the LPM module 156 will sometimes be referred to as a "second" power supply module. These respective modules 154, 156 may be separate components or may be integrated into a common semiconductor die.

The power interface 152 receives electrical power (e.g., voltage Vhost) from a host input terminal 157 associated with the host device. The interface uses this input host power to supply electrical power to other circuits and components, including a system on chip (SOC) 158. The voltage Vhost can be any suitable value, such as nominally +5V, +12V, etc. Multiple input host voltages can be concurrently supplied as desired.

The power supply module 154 incorporates a number of voltage regulators, logic and other elements to supply various supply (rail) voltages at various magnitudes. Both negative and positive voltages may be supplied. These various voltages are represented by voltage Vio which is a switchable data I/O voltage rail such as +12V, +5V, +3.3V, +2.5V, +1.8V, etc., and voltage Vcore which is a switchable core circuitry voltage rail such as +0.9V, etc.

The LPM module 156 includes a main power switch, represented at 160, which can take the form of a power transistor or other circuit element(s). The LPM module 156 receives the input host voltage Vhost and, when the switch 160 is closed, provides a corresponding voltage Vpower to the power supply module 154. It will be appreciated that other configurations for the main switch can be used, including as a switching input to one or more switchable power regulators that can be individually or collectively powered up or down.

The power management circuit 150 further includes an always on domain (AOD) power island, denoted generally as Region A in the SOC 158. The AOD includes a power control block 162 and a voltage sense circuit 164. The power control block 162 and the voltage sense circuit 164 are integrated into the circuitry of the SOC 158. More specifically, the power control block 162 and the voltage sense circuit 164 occupy a first region (Region A) of the SOC 158. The remainder of the SOC is identified as a second region (Region B).

Region A is electrically isolated from Region B. For reference, Region B may take a variety of configurations including additional power islands (not separately shown), but generally, Region B will be contemplated as constituting the majority of the overall SOC, and Region A will be contemplated as constituting a relatively small portion of the overall SOC.

The LPM module supplies a voltage Vioaon to the voltage sense circuit 164, which in turn supplies a voltage Vaon to the power control block 162. The voltages Vioaon and Vaon represent rail voltages that are always on so long as the Vhost voltage continues to be supplied to the device. The voltages Vioaon and Vaon may have voltage magnitudes that corresponds to the Vio voltage magnitude, or may take some other suitable voltage levels.

In some cases, the voltage Vioaon is further supplied to other components, such as a volatile memory 166. The volatile memory 166 is characterized as a dynamic random access memory (DRAM) and may serve as a memory space available to the SOC. For example, the DRAM memory 166 may constitute the data buffers 114, 144 of FIGS. 2-3, or some other memory of the device. Alternatively, internal volatile memory (not separately shown) may be incorporated into the AOD and remain powered during the LPM period. Non-volatile memory may also be employed. These respective memory devices can be used to store state information useful by the SOC at the conclusion of the LPM period The power control block 162 provides a power enable PWR_en signal to selectively open and close the switch 160 of the LPM module 156. The voltage sense circuit 164 monitors the voltage Vioaon and, as required, supplies a voltage fault (VF) signal to the power control block 162 indicating a voltage fault during the LPM period. For reference, the PWR_en signal may be considered a disable signal when transitioning the switch 160 to the open state, and a power enable signal when transitioning the switch to the closed state.

A processing core 168 of the SOC 158 is active during all modes of powered operation except for the low power mode. The processing core 168 may utilize system firmware 170, stored on-chip or elsewhere, to provide system control such as commands to initialize and operate the system, commands to the power interface 152 to selectively energize or turn off different aspects of the device to enact a reduced power mode level, and so on. Optionally, the second region (Region B) may further include a detector 172 adapted to detect power level command signals from the host, including wake up commands to transition to the normal power mode.

The Region B portion of the SOC 158, including the processing core 168, is specifically deactivated and receives no electrical power during LPM periods. By contrast, the Region A of the SOC 158 (e.g., the power control block 162 and the voltage sense circuit 164) remains active during all modes including LPM periods.

As will be appreciated, the AOD (Region A) is a power island within the SOC 158. A power island can be understood as a region of logic in a circuit device that is electrically isolated from other regions of the circuit device in such a way that the power island can remain electrically energized while the rest of the circuit device is de-energized without damaging the circuit device, or undesirably corrupting the functionality of either region. The AOD is incorporated into the same semiconductor die as the rest of the SOC 158. When both regions are active, the power control block 162 can readily communicate with the processing core 168.

The LPM module 156 of FIG. 4 provides a cooperative interface between the SOC 158 and the power supply module 154 with a straightforward enable/disable control architecture. The power control block 162 has a simple construction with a relatively low complexity of control logic. As depicted in FIG. 4, the SOC 158 provides a single bit (PWR_en) to enact the LPM operation. Multibit configurations are contemplated, such as mask bits to define different regulator states for different operational levels. The power control block 162 is always on as long as host supplies input power to the device to monitor for external inputs to wake up from the LPM by asserting the PWR_en signal or other input to the LPM module 156.

As will be appreciated, controlling the reset/power-on sequence can be an important consideration in designing a power system for a device. In the example of FIG. 4, the control signal from the power control block 162 is implemented using a tri-stateable I/O cell. The cell defaults to a tri-stated (no driving of the signal) mode at reset/power on. The power control block 162 powers on the rest of the system via the switch 160, and is generally designed to "fail on" so that, responsive to various inputs, the block automatically restores power to the rest of the system.

Figure 5:
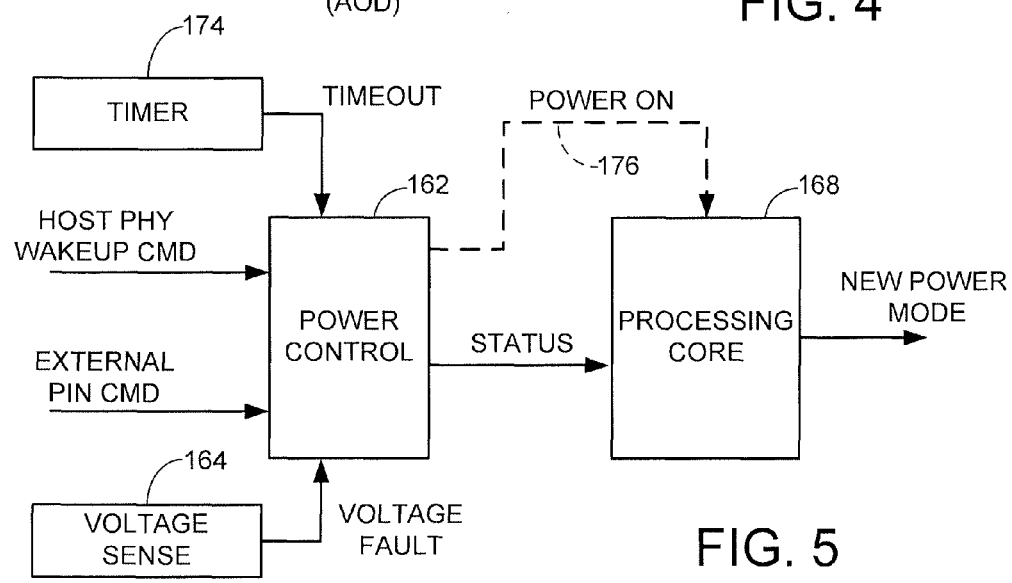
FIG. 5 shows aspects of the circuit of FIG. 4.

It follows that the power control block 162 should be configured to accurately detect wake up commands from various sources and proceed to re-energize the system accordingly. To this end, FIG. 5 is a functional block representation of representative portions of FIG. 4 to illustrate transition from LPM operation to normal operation.

A variety of inputs can be supplied to transition the system out of LPM operation. In some cases, the host device may send a wake up command to specifically request that the device wake up and return to normal operation. The wake up command may be sent via a host phy (physical interface layer) signal or an external pin. A separate sideband signal can be provided from the host using a dedicated conduit (wire) connected to the device to provide the wake up command.

Additionally or alternatively, a timer signal such as from a timer 174 may signal a resumption of higher mode activity after a selected period of time has been completed during the LPM interval. A detected voltage fault from the voltage sense circuit 164 can also be used to terminate an LPM interval and resume operation of the processing core 168.

Once a wake up event has been detected, the power control block 162 closes the main switch 160 (FIG. 4), thereby supplying power to the rest of the SOC 158 and transferring control to the processing core 168. This path is denoted at 176. Status information may be passed from the power control block 162 to the processing core 168 to indicate the form of the wake up event. For example, the status information may reflect the stimulus that caused the system to exit low power mode (e.g., timeout, a voltage fault or a detected host wake up signal). The core 168 can operate based on this status information to select an appropriate set of actions to resume a new power mode for the device.

The host wake up signals can be provided in any number of forms as desired in accordance with the requirements of a given application. It will be appreciated that, because the processing capabilities of the SOC 158 are suppressed during the LPM period, the AOD (Region A) should have sufficient detection capabilities to determine that the host has in fact requested a transition to a different power mode (e.g., a wake up event to resume normal operation).

Figure 6A:
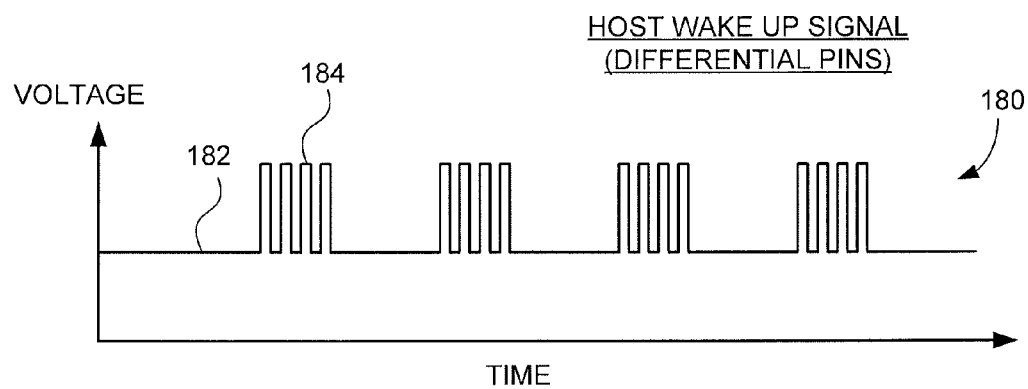
FIG. 6A depicts a wake up signal format in accordance with some embodiments.

FIG. 6A is a graphical representation of an example wake up signal 180 that may be supplied to the device from the host in order to resume normal operation (e.g., "wake up"). Other forms of signaling can be used as desired, so FIG. 6A is merely by way of illustration and not limiting.

As depicted in FIG. 6A, the host wake up signal 180 is supplied via a host phy differential pair as a differential voltage communication signal. The signal may constitute periods of idle signal level 182 (e.g., substantially no differential voltage) interspersed with burst periods 184 (localized high frequency bursts of differential voltage pulses). The burst periods 184 may or may not constitute intelligible information in and of themselves; in some cases it may be the relative timing and spacing of the periods 182, 184 that constitutes the wake up signal. In other embodiments, the signal may be in the form of a pulse width modulated (PWM) signal that signals a command to wake up so that the burst periods (levels 184) are nominally at a different constant level than the idle periods (levels 182).

Figure 6B:
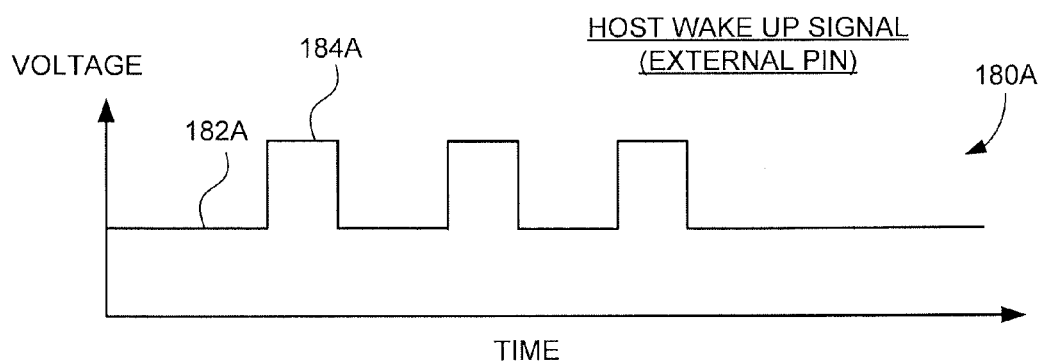
FIG. 6B depicts another wake up signal format in accordance with some embodiments.

FIG. 6B illustrates another form of a host wake up signal 180A. The wake up signal of 6B may be a sideband signal provided from a single external pin (or other input) adapted for this purpose. The sideband signal indicates either a request to wake up (at a first level, such as 182A) or a request to sleep (at a second level, such as 184A) using two signaling levels as shown. The processing core and the power control block can communicate to establish the appropriate detection convention.

When a host device desires to wake up the storage device (or other responding device), the host device may issue a wake up signal formatted such as in FIGS. 6A-B and then wait for a response. If no response is received in a selected period of time, such as several milliseconds, ms ($1 \times 10^{-3}$ sec), the host device may repeat transmission of the wake up signal. It can be seen that early and accurate detection of the wake up signal can significantly improve overall recovery time of the responding device.

Figure 7:
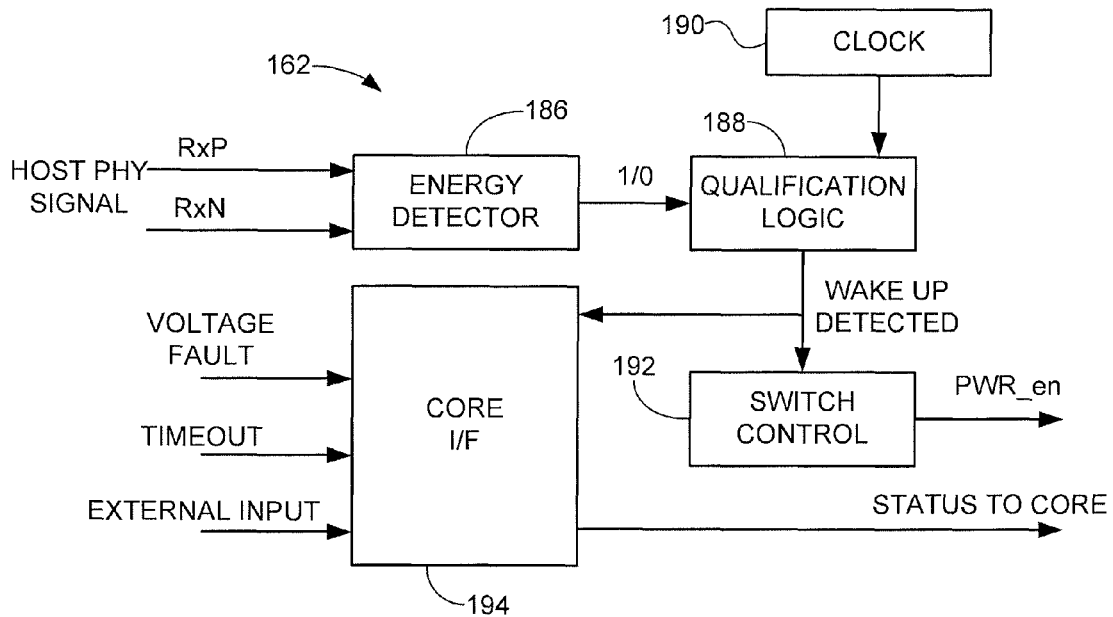
FIG. 7 illustrates the power control block of FIG. 4 in accordance with some embodiments.

FIG. 7 depicts relevant portions of the power control block 162 of FIG. 4 to illustrate capabilities to properly detect and respond to a wake up signal as formatted in FIGS. 6A-B. The power control block 162 is shown to include an energy detector 186, qualification logic 188, a clock circuit 190, a switch control block 192 and a processing core interface (I/F) 194. These blocks are functional in nature and can be realized in a variety of ways, including incorporation of various aspects into one or more combined circuits. Each of the circuit blocks in FIG. 7 form a portion of the AOD (Region A) and are nominally always powered so long as host power is supplied to the system.

The wake up signal from FIG. 6A is shown to be supplied as a host phy signal (e.g., RxP/RxN) to the energy detector 186. The energy detector 186 may be configured as a simple voltage sense circuit or may take another configuration. Generally, the energy detector 186 operates to detect the presence of energy on the associated host RxP/RxN input line. The energy may be detected as a change in differential voltage with respect to a predefined threshold. The energy detector 186 may output a simple single bit: a first level (e.g., logic "0") signal level when no energy disturbances are detected, and a second level (e.g., logic "1") signal when energy disturbances are present.

The qualification logic block 188 receives the output sequence from the energy detector and decodes the input sequence to determine whether the detected energy disturbances on the input host line correspond to an intelligible wake up command sequence (e.g., FIG. 6A). The qualification logic block 188 may utilize clock inputs from the clock circuit 190, which may be realized as a relatively low power, relatively high error (ppm) clock circuit. The clock may be a single phase ring oscillator, a voltage control oscillator or other similar construction. It will be appreciated that a lower resolution clock may introduce some potential resolution error in the qualification operation, but beneficially reduces the overall power consumption of the AOD. Moreover, the use of an internally generated clock eliminates the need for an external clock and associated connection inputs and additional power consumption requirements.

The qualification logic block 188 operates as a detection circuit to detect and decode the input sequence from the energy detector 186. Timing windows and threshold comparison levels may be applied in order to characterize the input sequence. It is contemplated that disturbances may arise during LPM periods, and the qualification logic block 188 may thus serve to filter out and provide, with a reasonably high level of confidence, when a wake up signal has in fact been transmitted by the host device via the host phy differential pair RxP/RxN or other signal path. At such times that the qualification logic 188 detects a wake up event, a signal is passed to the switch control block 192, which proceeds to close the main switch 160, thereby re-energizing the system including the SOC 158. The output from the qualification logic block 188 may also be supplied to the core I/F 194, which supplies status information to the processing core 168 (FIG. 4). The status information may, for example, indicate that the power control block 162 has detected a wake up signal from the host, causing the processing core 168 to provide an appropriate response to the host device. In other situations in which the power control block 162 exists the LPM period, the status information may indicate the cause was a voltage fault, a time out event, etc.

In some embodiments, a power up/power down two-state sideband signal as generally depicted in FIG. 6B. Since the signal generally only has two states, the signal processing provided by the qualification logic 188 may be unnecessary and so the core I/F circuitry 194 can receive this signal directly as depicted in FIG. 7. It will be understood that in this case, both the blocks 186, 194 operate as energy detectors to detect energy on the input signal path. The configuration of FIG. 7 allows the system to remain in the LPM period until a wake up signal (if received) is qualified so that it is determined, with a reasonable level of confidence, that the host device has in fact requested resumption of normal operation (or some other mode depending on the configuration of the system).

Figure 8:
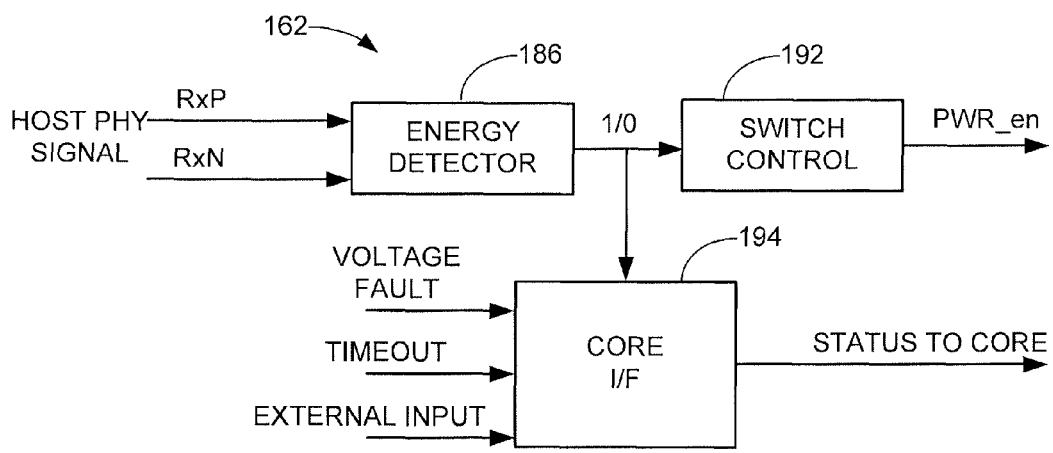
FIG. 8 illustrates the power control block of FIG. 4 in accordance with other embodiments.

In other embodiments, qualification of a wake up signal is carried out by the SOC 158. FIG. 8 shows such a configuration. FIG. 8 includes various elements from FIG. 7 and therefore similar reference numerals are used to denote similar components.

In FIG. 8, as before the energy detector 186 monitors the host input line (e.g., the host phy signal, the host RxP/RxN dedicated pin, etc.) for an energy signature. Once such is detected, the energy signals the switch control block 192 directly, causing an immediate re-application of system power by the closing of the main switch 160 (FIG. 4). The core I/F 194 communicates this status to the processing core 168, which may then elect to carry out the actual qualification of a wake up signal from the host device, such as by way of the optional Region B detector 172 of FIG. 4. As before, the external pin signal (FIG. 6B) can be supplied to blocks 186 or 194 for energy detection.

The embodiment of FIG. 7 provides qualification prior to power on, whereas the embodiment of FIG. 8 detects a disturbance and "fails on" to allow the SOC 158 to determine whether in fact a wake up event has been declared. In some cases, both capabilities may be made available and can be selectively enacted. The embodiment of FIG. 7 may consume relatively more power since the qualification and clock circuitry 188, 190 are activated as compared to the embodiment of FIG. 8.

The use of a higher ppm clock 190 will tend to increase the error in detection events, but at the advantage of reduced power consumption requirements during the LPM period. In some embodiments, qualification circuitry can be provided in both Region A (e.g., the qualification logic 188/clock 190) and Region B (e.g., the detection circuit 172) and either or both can be used in various operational modes. If both are used in succession, further confidence in the detection of a wake up signal from the host can be obtained.

It will be appreciated that the foregoing embodiments can allow the device to exit from a low power mode during extremely low power consumption without the need for additional electrical connections, other than those provided by the normal interconnection paths, with the host. Enabling lower power modes will tend to extend battery life in portable applications and normal power modes can benefit from an interface driven solution that is not normally available using existing interface configurations.

Figure 9:
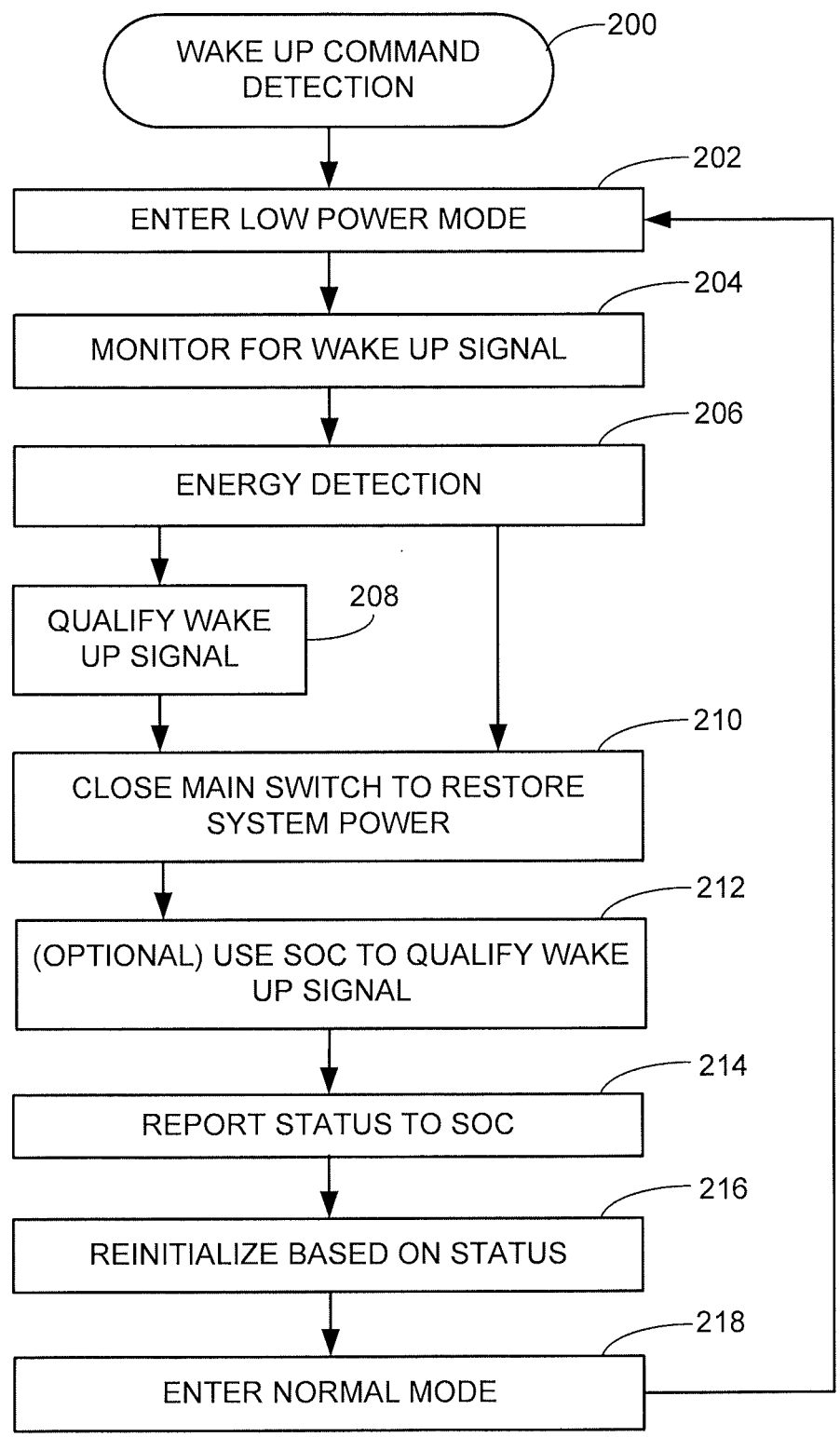
FIG. 9 is a flow chart for a wake up command detection routine.

The circuitry of both FIGS. 7 and 8 further have the capability of detecting so-called brown out conditions in which a temporary reduction in the host input voltage (or other input power level) is detected. Multiple threshold levels may be monitored. For example, a nominal host input voltage level of about +5V may be supplied via the host input line. Voltage detection thresholds of various successive levels, such as 4.1V, 4.0V, 2.5V, etc. can be applied. If the voltage temporarily dips below some thresholds but not others so that the voltage recovers to its original level, the AOD may elect to wake up the rest of the SOC or merely log the event and report it to the SOC during subsequent wake up, depending upon the extent and/or duration of the voltage droop event. On the other hand, if the host input voltage continues to drop so that it appears that the host is enacting a power off event, the AOD may elect to allow itself to turn off without reapplying power to the rest of the SOC. FIG. 9 is a flow chart for a wake up detection routine 200 to illustrate aspects of the foregoing discussion. It will be appreciated that the flow chart is merely for purposes of illustrating a particular example and is not limiting. Various steps can be modified, omitted and/or added as required by a given application. For purposes of the present discussion, it will be contemplated that the routine is carried out by the circuitry of FIGS. 4, 6-7 as embodied in the storage device 110 of FIG. 2. Other environments can be readily used.

At step 202, the storage device 110 enters a low power mode (LPM). This includes the transitioning of the main switch 160 by the power control block 162 to an open position, thereby powering down remaining portions of the device including the Region B of the SOC 158. During the LPM period, the power control block 162 monitors for a wake up indication signal from various sources, including from the host (as in FIG. 6), from the timer 174 (FIG. 5) or from a voltage fault (FIG. 5).

At step 206, an energy disturbance on a host input line is detected, such as by the energy detector 186. Different paths of operation may be taken at this point. As indicated by step 208, a qualification operation is carried out upon the input signal, as discussed above in FIG. 7, by the AOD power island (Region A) using the qualification logic 188 and the high ppm clock 190. Alternatively, no such qualification may be carried out at the AOD power island level.

In both cases, the main switch 160 is closed at step 210 to restore system power. If qualification did not take place prior to the restoration of system power, such may now be carried out by the SOC 158 (e.g., via detector 172) at step 212. The AOD power island further reports status information to the SOC 158 at step 214, such as via the core I/F circuit 194 in both FIGS. 7 and 8.

The SOC 158 proceeds to reinitialize the system based on the input status at step 216, and the device 110 enters a normal mode of operation at step 218. It will be appreciated that this normal operation will continue until a sleep command from the host or an internal timer indicates that the LPM should be re-entered, at which point the routine returns to step 202, as shown.

From the foregoing discussion it can be seen that the various embodiments disclosed herein can provide a number of benefits. Power consumption levels in the disclosed LPM may be significantly lower than other previously achievable levels. In some cases, power consumption of a hard disc drive (HDD) configured as disclosed herein has been found to be reduced to a range of about 12.5 mW, which is about an order of magnitude less than what was otherwise achievable by maintaining the SOC in a powered state (e.g., about 10 mW v. 100 mW or more).

Upon wake up, the processing core may elect to enter any suitable power state, including normal operational mode or some other power mode including transitioning to a power off mode. For example, the processing core may elect to perform a full reset or reinitiate a power down mode so that it goes back to an unpowered state based on status information supplied to the core from the AOD. The system as disclosed also provides enhanced reliability, in that requests to power down the system can be ignored if a voltage fault condition is present or has been detected. The system firmware is in charge of determining exactly when LPM is entered, and so the firmware can defer entry until safe entry can be achieved. The status of the low power mode can be reported to the system as it wakes up, allowing the system to take an appropriate reset approach (e.g., cold or warm reboot, etc.). The use of energy detection circuitry and, as desired, qualification logic at the AOD power island level can ensure improved detection of actual wake up requests by the host, leading to improved response times by a device. As embodied herein, a data storage device environment has been used for illustration purposes, but any number of different types of operational environments can be used.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
a system on chip (SOC) integrated circuit comprising a first region having a processing core and a detector circuit and a second region electrically isolated from the first region and comprising an always on domain power island with a power control block, the power control block comprising an energy detector coupled to a host input line;
a first power supply module adapted to selectively apply power to the first region responsive to a main switch; and
a second power supply module adapted to continuously supply power to the second region, the power control block configured to open the main switch to enter a low power mode during which no electrical power is supplied to the first region, the power control block further configured to close the main switch to resume application of electrical power to the first region responsive to a detection of electrical energy on the host input line by the energy detector, the processing core operating in a fail on mode of operation responsive to the resumed application of electrical power to the first region to qualify the detection of electrical energy on the host input line by the energy detector as a wake up command using the detector circuit and status information supplied by the power control block and to transition to a normal operational mode to process host commands responsive to the qualification of the detection of the electrical energy as a wake up command, the status information comprising a status indication to the processing core indicative of a presence or an absence of a fault condition detected during the low power mode, the processing core initiating a cold boot reinitialization or a warm boot reinitialization responsive to the status indication from the power control block.

2. The apparatus of claim 1, in which the power control block further comprises a qualification logic block which interprets the electrical energy as a host wake up signal from the host device on the host input line from a sequence of outputs from the energy detector and supplies the status information to the processing core.

3. The apparatus of claim 2, in which the power control block further comprises a low power clock circuit that outputs a single phase internal clock signal to the qualification logic block so that no external clock signal is supplied to the AOD.

4. The apparatus of claim 1, in which the energy detector detects a host wake up signal on the host input line as a differential signal on a pair of host phy connection pins.

5. The apparatus of claim 2, in which the power control block further comprises a switch control circuit which transitions the main switch to the closed state responsive to the qualification logic block.

6. The apparatus of claim 1, in which the power control block further comprises a processing core interface circuit which transfers the status information to the processing core of the first portion that identifies a selected one of a plurality of events that induced the power control block to close the main switch and resume application of power to the first region.

7. The apparatus of claim 6, in which the plurality of events include a timeout signal from a timer initiated at a commencement of the low power mode period, a detected voltage fault during the low power mode period, and a detected wake up signal from the host input line.

8. The apparatus of claim 1, in which the first and second power supply modules respectively generate the first and second supply voltages responsive to an input host supply voltage from the input host supply terminal, and wherein the input host supply voltage is not supplied to the first power supply module responsive to the main switch being transitioned to said open state.

9. The apparatus of claim 1, in which the power control block transitions the main switch to an open state by transmitting a power disable signal to the second power supply module responsive to a control signal transmitted to the power control block from the processing core.

10. The apparatus of claim 1, in which the second region of the SOC further comprises a voltage sense circuit which monitors the second supply voltage during the low power mode and transmits a voltage fault signal to the power control block responsive to a magnitude of the second supply voltage during the low power mode and a predetermined threshold.

11. The apparatus of claim 1, the processing core further configured to operate in the fail on mode to identify an occurrence of a detected voltage fault during the low power mode period responsive to the status information.

12. The apparatus of claim 1, in which the processing core, the power control block and the energy detector are each formed of a respective plurality of transistors incorporated into the SOC.

13. The apparatus of claim 1, further comprising a volatile memory, the second power supply module further adapted to continuously supply power to the volatile memory during the continuous supply of power by the second power supply module to the second region.

14. The apparatus of claim 1, in which the SOC is characterized as a storage controller circuit of a data storage device, and the apparatus further comprises a memory adapted to store data from a host device responsive to control inputs provided by the storage controller circuit.

15. A method comprising:

connecting a system on chip (SOC) integrated circuit to a power interface, the SOC comprising a first region and a second region electrically isolated from the first region as an always on domain power island, the first region having a processing core and a detector circuit, the second region having a power control block comprising an energy detector coupled to a host input line, the power interface comprising a first power supply module adapted to selectively apply first power to the first region and a second power supply module adapted to continuously supply second power to the second region, the second power supply module comprising a main switch between the first power supply module and a host input voltage terminal;

opening the main switch to place the SOC into a low power mode by removing electrical power from the first region;

closing the main switch to return electrical power to the first region responsive to a detection of electrical energy on the host input line by the energy detector to transition the processing core into a fail on mode of operation;

using the processing core in the fail on mode of operation to qualify the detection of electrical energy on the host input line by the energy detector as a wake up command using the detector circuit and status information supplied by the power control block, the status information comprising a status indication to the processing core indicative of a presence or an absence of a fault condition detected during the low power mode; and using the processing core to transition the SOC to a normal operational mode to process host commands responsive to the qualification of the detection of the electrical energy as a wake up command by initiating a cold boot reinitialization or a warm boot reinitialization responsive to the status indication from the power control block.

16. The method of claim 15, in which the power control block further comprises a qualification logic block, and the closing step further comprises detecting a host wake up signal from the host device on the host input line from a sequence of outputs from the energy detector.

17. The method of claim 16, in which the power control block further comprises a low power clock circuit, and the closing step further comprises outputting a single phase clock signal to the qualification logic block from the low power clock circuit during said detecting of the host wake up signal.

18. The method of claim 15, in which the status information communicated from the power control block to the processing core comprises information indicative of an event that initiated the closing of the main switch.

19. The method of claim 18, in which the event comprises a selected one of a timeout signal from a timer initiated at a commencement of the low power mode period, a detected voltage fault during the low power mode period, or a detected wake up signal from the host input line.

20. The method of claim 15, in which the SOC is characterized as a storage controller circuit of a data storage device.

* * * * *